(12) United States Patent
Boure et al.

(10) Patent No.: US 12,542,987 B2
(45) Date of Patent: Feb. 3, 2026

(54) VEHICLE GLAZING WITH AUDIO EXCITER

(71) Applicant: SAINT-GOBAIN GLASS FRANCE, Courbevoie (FR)

(72) Inventors: Jean-Philippe Boure, Ribecourt-Dreslincourt (FR); Antoine Lallement, Compiegne (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 476 days.

(21) Appl. No.: 17/924,876

(22) PCT Filed: May 11, 2021

(86) PCT No.: PCT/FR2021/050819
§ 371 (c)(1),
(2) Date: Nov. 11, 2022

(87) PCT Pub. No.: WO2021/229179
PCT Pub. Date: Nov. 18, 2021

(65) Prior Publication Data
US 2023/0217143 A1 Jul. 6, 2023

(30) Foreign Application Priority Data
May 13, 2020 (FR) ...................................... 2004695

(51) Int. Cl.
*H04R 1/02* (2006.01)
*B32B 7/12* (2006.01)
(Continued)

(52) U.S. Cl.
CPC .............. *H04R 1/025* (2013.01); *B32B 7/12* (2013.01); *B32B 15/18* (2013.01); *B32B 15/20* (2013.01);
(Continued)

(58) Field of Classification Search
CPC ............................... H04R 1/025; H04R 1/028
See application file for complete search history.

(56) References Cited

U.S. PATENT DOCUMENTS

| 4,591,203 A | 5/1986 | Furman |
| 4,723,809 A | 2/1988 | Kida et al. |

(Continued)

FOREIGN PATENT DOCUMENTS

| CN | 108124029 A | 6/2018 |
| CN | 110506309 A | 11/2019 |

(Continued)

OTHER PUBLICATIONS

International Search Report as issued in International Patent Application No. PCT/FR2021/050819, dated Sep. 8, 2021.

(Continued)

*Primary Examiner* — Carolyn R Edwards
*Assistant Examiner* — Dylan Maguire Neece
(74) *Attorney, Agent, or Firm* — Pillsbury Winthrop Shaw Pittman LLP

(57) ABSTRACT

A vehicle glazing includes a glass sheet or a glazed assembly, a part made of plastic material partly covering the glass sheet or the glazed assembly, at least one fixing system for an audio exciter mounted on the glass sheet or on the glazed assembly, including a base and an attachment part, the base of the fixing system being connected to the part made of plastic material, and at least one audio exciter fixed to the attachment part of the fixing system.

15 Claims, 3 Drawing Sheets

(51) Int. Cl.
*B32B 15/18* (2006.01)
*B32B 15/20* (2006.01)
*B32B 17/10* (2006.01)
*B32B 27/30* (2006.01)
*B32B 27/32* (2006.01)
*B32B 27/36* (2006.01)
*B32B 27/40* (2006.01)
*B60J 1/20* (2006.01)

(52) U.S. Cl.
CPC .. *B32B 17/10761* (2013.01); *B32B 17/10788* (2013.01); *B32B 27/30* (2013.01); *B32B 27/302* (2013.01); *B32B 27/304* (2013.01); *B32B 27/306* (2013.01); *B32B 27/32* (2013.01); *B32B 27/36* (2013.01); *B32B 27/40* (2013.01); *B60J 1/20* (2013.01); *H04R 1/028* (2013.01); *B32B 2274/00* (2013.01); *B32B 2605/006* (2013.01); *H04R 2440/05* (2013.01); *H04R 2499/13* (2013.01)

(56) References Cited

U.S. PATENT DOCUMENTS

| | | | |
|---|---|---|---|
| 9,621,994 B1 * | 4/2017 | Bongiovi | H04R 11/02 |
| 10,397,695 B2 * | 8/2019 | Ovens | H04R 1/288 |
| 2008/0160298 A1 * | 7/2008 | Li | B32B 37/182 |
| | | | 428/447 |
| 2009/0184589 A1 | 7/2009 | Yamagishi | |
| 2013/0214555 A1 | 8/2013 | Ackerman et al. | |
| 2017/0320297 A1 * | 11/2017 | Bennison | B32B 17/00 |

FOREIGN PATENT DOCUMENTS

| | | | | |
|---|---|---|---|---|
| CN | 110706687 A | | 1/2020 | |
| EP | 0 382 602 A1 | | 8/1990 | |
| FR | 2916380 A1 | * | 11/2008 | ....... B29C 45/14377 |
| FR | 3 021 268 A1 | | 11/2015 | |
| KR | 20160069459 A | * | 6/2016 | ............ B32B 27/38 |
| WO | WO 00/54549 A2 | | 9/2000 | |
| WO | WO 2013/164540 A1 | | 11/2013 | |

OTHER PUBLICATIONS

Search Report as issue in Chinese Patent Application No. 202180002349.7, dated Jul. 28, 2025.

* cited by examiner

[Fig.1]
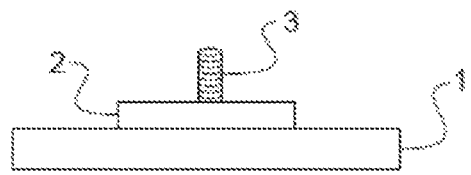
[Fig.2]
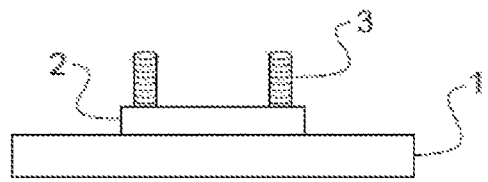
[Fig.3]
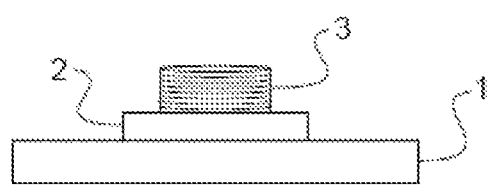
[Fig.4]
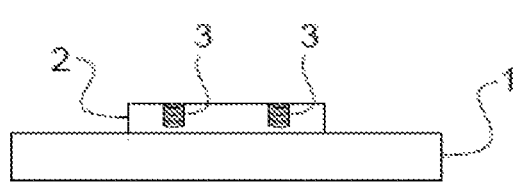
[Fig.5]
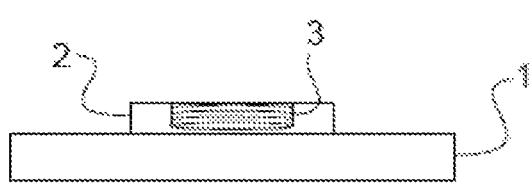
[Fig.6]
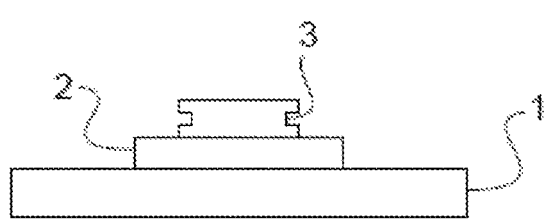

[Fig.7]
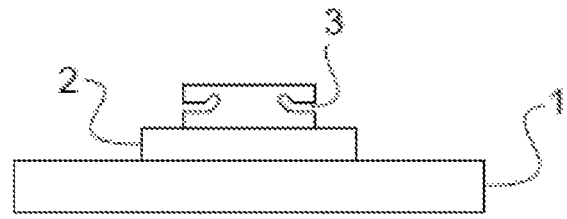
[Fig.8]
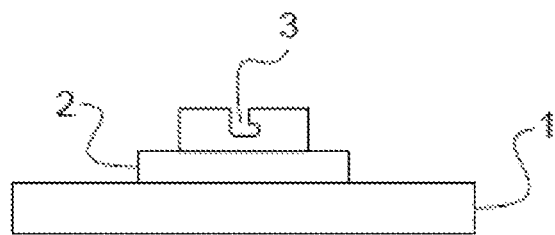
[Fig.9]
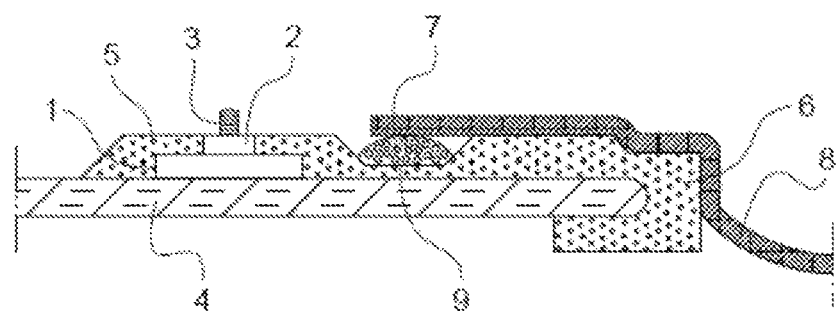
[Fig.10]
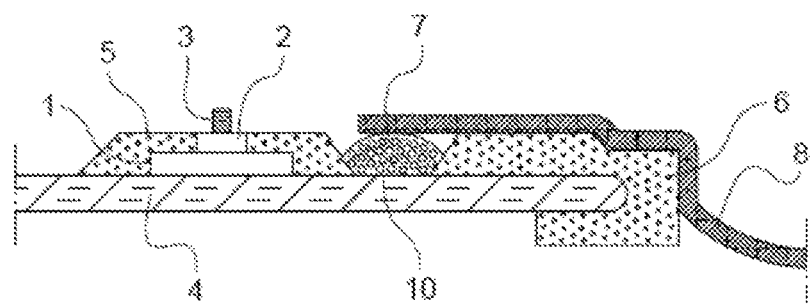

[Fig.11]
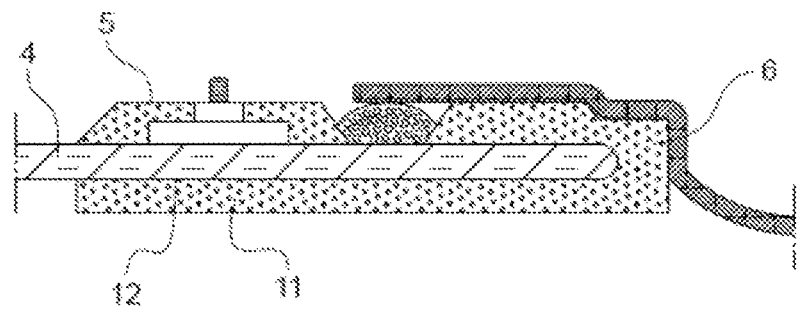
[Fig.12]
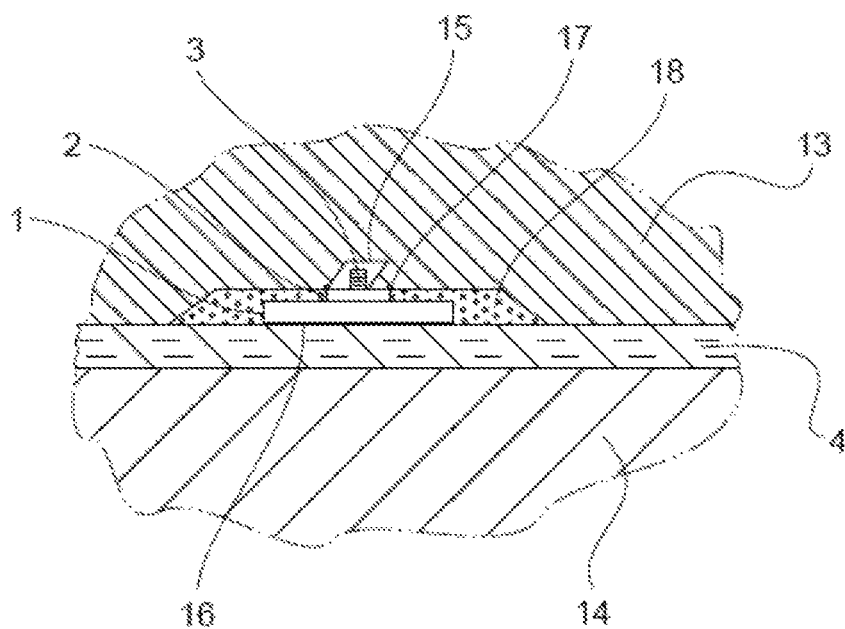

VEHICLE GLAZING WITH AUDIO EXCITER

CROSS-REFERENCE TO RELATED APPLICATIONS

This application is the U.S. National Stage of PCT/FR2021/050819, filed May 11, 2021, which in turn claims priority to French patent application number 2004695 filed May 13, 2020. The content of these applications are incorporated herein by reference in their entireties.

TECHNICAL FIELD OF THE INVENTION

The present invention relates to a vehicle glazing comprising at least one audio exciter.

TECHNICAL BACKGROUND

Audio or surface exciters make it possible to generate sound from any given wall (plaster, glass, wood, etc.) for mainly audio functions but also for specific applications such as active control of noise or vibrations. The sound generation is caused by the vibrations of the structure to which the exciter is secured via a rigid connection.

For example, document WO 2013/164540 discloses glazing comprising a piezoelectric transducer formed by a piezoelectric element located between two electrodes, for diverse applications such as: to clean the dust present on the glazing, as a speaker, as a microphone, as an electricity generator or to deaden or amplify sounds coming from outside or inside a building.

Specifically in the automotive industry, new audio functionalities are being developed. In addition to traditional entertainment, advanced entertainment, active noise control, personal voice assistant, engine sound design are new functionalities made possible today by technological developments in transducers, controllers and signal processing. To perform these functions, modern cars are equipped with an increasing number of sensors and audio surface exciters.

Compared to conventional speakers, audio exciters can be lighter. Due to their compact size, they can be integrated into door panels, various trims (such as roof or pillar trims), and thus be positioned in the passenger compartment as close as possible to the ears of the passengers. They can be used in addition to or instead of standard loudspeakers.

However, the integration of such equipment is subject to a specific constraint in the automotive field: it must comply with the standards (such as ECE R21 and ECE R26) and specifications of car manufacturers for the safety of the passengers in the motor vehicle's passenger compartment.

There is a need to develop a vehicle audio system that can be lighter, with good sound performance, and that ensures passenger safety.

SUMMARY OF THE INVENTION

The invention relates firstly to a vehicle glazing comprising:
- a glass sheet or a glazed assembly,
- a part made of plastic material partly covering the glass sheet or the glazed assembly,
- at least one fixing system for an audio exciter mounted on the glass sheet or on the glazed assembly, comprising a base and an attachment part, the base of the fixing system being connected to the part made of plastic material, and
- at least one audio exciter fixed to the attachment part of the fixing system.

In certain embodiments, the base is fixed to the glass sheet or glazed assembly using a double-sided adhesive tape or glue.

In certain embodiments, the audio exciter is fixed to the attachment part by screwing and/or interlocking.

In certain embodiments, the glass sheet is made of organic or mineral glass, or the glazed assembly comprises at least one glass sheet that is made of organic or mineral glass.

In certain embodiments, the glazing comprises a glazed assembly and the glazed assembly is a laminated glazing comprising at least two glass sheets between which at least one interlayer film of viscoelastic plastic is inserted, the interlayer film of viscoelastic plastic preferably being made of PVB (polyvinyl butyral) or of ethylene-vinyl acetate copolymer, in particular of standard PVB or, more preferably, of acoustic PVB.

In certain embodiments, the part made of plastic material is overmolded onto at least a part of the base of the fixing system.

In certain embodiments, the base of the fixing system comprises a soleplate mounted on the glass sheet or on the glazed assembly and surmounted by a mounting, the soleplate projecting with respect to the mounting.

In certain embodiments, the fixing system is made of a metallic material, such as aluminum and/or stainless steel, a thermoplastic material, such as polyphthalamides, polyvinyl chloride, and/or polyethylene terephthalate, or a combination thereof.

In certain embodiments, the part made of plastic material is made of polyurethane, polypropylene, or a combination thereof.

In certain embodiments, the base of the fixing system is thermoformed into the part made of plastic material; preferably the fixing system is thermoformed in the part made of plastic material.

In certain embodiments, the part made of plastic material and the base of the fixing system are made of polyethylene, thermoplastic elastomer, acrylonitrile butadiene styrene, or a combination thereof.

In certain embodiments, the glazing is a windscreen, a rear window, a side glazing and/or a roof glazing of a vehicle, preferably an automobile.

The invention is also directed to a method for manufacturing glazing as described herein before, comprising the following steps:
- placing the glass sheet or the glazed assembly in a mold;
- positioning the fixing system comprising a base and an attachment part in the mold on the glass sheet or on the glazed assembly;
- closing the mold so as to create a mold cavity around the base of the fixing system, the attachment part of the fixing system being outside the mold cavity;
- injecting plastic material into the molding cavity so as to form an overmolding constituting the part made of plastic material;
- opening the mold and demolding the overmolded glass sheet or the overmolded glazed assembly;
- fixing at least one audio exciter to the attachment part of the fixing system.

The invention is also directed to a method for manufacturing glazing as described herein before, comprising the following steps:
- placing a block of plastic material in a mold configured to form the fixing system comprising a base and an attachment part;

heating the block of plastic material so as to soften it;
cooling the plastic material so as to obtain a thermoformed part comprising the part made of plastic material and the fixing system;
demolding the thermoformed part;
assembling the thermoformed part with the glass sheet or glazed assembly;
fixing at least one audio exciter to the attachment part of the fixing system.

The present invention makes it possible to meet the need expressed herein before. It more particularly provides a vehicle glazing with a light and compact audio system that offers good sound performance. Additionally, the glazing according to the invention is adapted to any vehicle and makes it possible to ensure the safety of the passengers of the vehicle in which it is placed.

This is achieved by combining an audio exciter with a glass sheet or glazed assembly by means of a specific fixing system. Indeed, since the glazing in vehicles generally has a large surface area, they make it possible to offer the audio exciter a large surface area capable of vibrating to produce a sound, thus allowing optimum sound performance. Furthermore, they are typically located near the ears of the passengers of the vehicle, which enables a better auditory experience for the passengers. Additionally, the fixing system according to the invention connecting the exciter to the glass sheet or to the glazed assembly makes it possible to meet the constraints imposed by the standards with regard to the safety of the passengers of the vehicle.

BRIEF DESCRIPTION OF THE FIGURES

FIG. 1 depicts a schematic view of an example of a fixing system for use in the glazing according to the invention.

FIG. 2 depicts a schematic view of another example of a fixing system for use in the glazing according to the invention.

FIG. 3 depicts a schematic view of another example of a fixing system for use in the glazing according to the invention.

FIG. 4 depicts another example of a fixing system for use in the glazing according to the invention.

FIG. 5 depicts a schematic view of another example of a fixing system for use in the glazing according to the invention.

FIG. 6 depicts a schematic view of another example of a fixing system for use in the glazing according to the invention.

FIG. 7 depicts a schematic view of another example of a fixing system for use in the glazing according to the invention.

FIG. 8 depicts a schematic view of another example of a fixing system for use in the glazing according to the invention.

FIG. 9 depicts a schematic cross-sectional view of a portion of an example of glazing according to the invention.

FIG. 10 depicts a schematic cross-sectional view of a portion of another example of glazing according to the invention.

FIG. 11 depicts a schematic cross-sectional view of a portion of another example of glazing according to the invention.

FIG. 12 depicts a schematic cross-sectional view of an example of an installation allowing the manufacture of a glazing according to the invention. In this figure, only a part of the mold and a part of the glass sheet have been depicted.

DETAILED DESCRIPTION

The invention is disclosed below in greater detail and in a non-limiting manner in the following disclosure.

The invention relates to a vehicle glazing. The vehicle may be any type of vehicle comprising at least one glazing unit. Preferably, this is a land transport motor vehicle, although the present invention is also applicable to glazing for aeronautical vehicles, such as helicopters, airplanes and ships. More preferably, the vehicle is a motor vehicle (car). Alternatively, the vehicle may be a truck, van, bus or coach.

According to the present invention, "glazing" denotes any structure comprising at least one glass sheet or a glazed assembly. Thus, the glazing may for example comprise a single glass sheet or a glazed assembly made up of laminated glazing consisting of at least two glass sheets between which an interlayer made of viscoelastic plastic material is disposed. "Glazed assembly" is understood to mean a multi-layer glazed element of which at least one layer is a glass sheet.

The glass sheet or the glazed assembly may be transparent or opaque, e.g., when the glass sheet or the glazed assembly is covered with an opaque coating. The opaque coating may be a paint or an enamel, e.g., black-colored. The glass sheet or the glazed assembly may comprise a transparent glazed part and an opaque glazed part, preferably the opaque glazed part surrounding the transparent glazed part. Alternatively, the glass sheet, or the glazed assembly, may be tinted in its thickness over all or part of its surface.

The glass sheet is made of organic or mineral glass. The glass sheet may be tempered glass.

More preferably, the glazing according to the invention comprises a glazed assembly. The glazed assembly comprises at least one glass sheet. The glass may be organic or mineral glass. The glass may be tempered. The glazed assembly is preferably laminated glazing. The term "laminated glazing" is understood to mean at least two glass sheets between which at least one interlayer film of viscoelastic plastics material is inserted. The use of laminated glazing, with respect to a single glass sheet, leads to a flatter response due to the dampening provided by the interlayer film, which improves the response of the audio system, in particular as regards the low frequencies. The interlayer film made of viscoelastic plastic material may comprise one or more layers of a viscoelastic polymer such as polyvinyl butyral (PVB) or an ethylene vinyl acetate copolymer (EVA) preferably PVB. The interlayer film is preferably made of standard PVB or, even more preferably, of acoustic PVB (such as single-layer or tri-layer acoustic PVB). Acoustic PVB generally consists of three layers: two outer layers of standard PVB and an inner layer of PVB with added plasticizer to make it less rigid than the outer layers. The use, in laminated glazing, of an acoustic PVB, with respect to a standard PVB, makes it possible to further improve the low frequency restitution and to reduce vibration problems.

The glazing according to the invention may be any vehicle glazing. In particular, it may be a windscreen, any side glazing, in particular door glazing, a rear window and/or roof glazing.

The glazing according to the invention may have any possible shape. In certain embodiments, the glazing has a quadrilateral shape, in particular rectangular or substantially rectangular, or trapezoidal or substantially trapezoidal. The edges of the glazing may be straight or substantially straight (they may have a slight curve) and/or curved. In particular, the glass sheet or the glazed assembly of the glazing may have the shapes mentioned herein before.

The glazing according to the invention may be a glazing glued (or intended to be glued) or not glued. The glazing may be encapsulated or unencapsulated glazing. The term "encapsulated glazing" is understood to mean a glazing in which the glass sheet or the glazed assembly is coated over at least part of its edge with a polymer material overmolded on said glass sheet or on said glazed assembly. This overmolded polymer part is referred to as encapsulating seal. Preferably, the encapsulating seal surrounds said edge part of the glass sheet, or of the glazed assembly, i.e., it is positioned against the rim of the glass sheet, or of the glazed assembly, and on the border of the two opposite main surfaces of the glass sheet, or of the glazed assembly. Advantageously, an encapsulated glazing comprises an encapsulating seal over the entire edge of the glass sheet or of the glazed assembly (i.e., over the entire periphery of the glass sheet or of the glazed assembly).

The glazing according to the invention comprises at least one audio exciter. In this regard, it forms an audio system, i.e., a system capable of emitting sounds. In certain embodiments, the glazing may comprise a single audio exciter, or at least two audio exciters, or at least 3, or at least 4, or at least 5, or at least 10, or at least 15 audio exciters, e.g., from 1 to 2, or from 2 to 3, or from 3 to 4, or from 4 to 5, or from 5 to from 5 to 6, or from 6 to 7, or from 7 to 8, or from 8 to 9, or from 9 to 10, or from 10 to 12, or from 12 to 15, or from 15 to 20 audio exciters. When the glazing comprises several audio exciters, the characteristics disclosed hereunder may be applied to at least one of the audio exciters, to each audio exciter independently, or to all the audio exciters.

The audio exciter (or actuator, or transducer) according to the invention may be any exciter transforming an electric current into mechanical energy making it possible to vibrate a surface, used as a diaphragm, to create a sound wave. In the context of the present invention, the surface vibrated by the exciter comprises or is the glass sheet or the glazed assembly.

The audio exciter may be a piezoelectric audio exciter or an electrodynamic audio exciter (or an inertial exciter). In a particular preferred way, the audio exciter is an electrodynamic exciter. Indeed, piezoelectric exciters require a very high voltage and generally include expensive, heavy electronic components.

Advantageously, the audio exciter has a weight of less than 300 g, preferably of 100 to 200 g. The audio exciter may have a weight of 30 to 50 g, or of 50 to 80 g, or of 80 to 100 g, or of 100 to 120 g, or of 120 to 150 g, or of 150 to 180 g, or of 180 to 200 g, or of 200 to 300 g.

The audio exciter advantageously has a diameter of 10 to 150 mm, e.g., of 30 to 100 mm. Alternatively, the audio exciter may have a length of 30 to 200 mm, e.g., of 50 to 150 mm, and/or a width of 10 to 100 mm, e.g., of 20 to 60 mm. The audio exciter may have a depth of 10 to 50 mm, e.g., of 12 to 30 mm.

The audio exciter may be configured to generate high frequencies and/or medium frequencies and/or low frequencies. "High frequencies" is understood to mean sound waves with a frequency higher than 2000 Hz. "Medium frequencies" is understood to mean sound waves with a frequency ranging from 300 to 2000 Hz. "Low frequencies" is understood to mean sound waves with a frequency lower than 300 Hz. The audio exciter may comprise a signal filter for limiting the generated frequency band, e.g., to high and/or medium and/or low frequencies. For example, the signal filter may limit the emitted frequency band to a frequency range, this frequency range having a lower limit which is greater than or equal to 2000 Hz, or which is greater than or equal to 300 Hz, or which is greater than or equal to 150 Hz, or this frequency range having an upper limit that is less than or equal to 300 Hz.

The audio exciter may be placed at any point on the glass sheet or on the glazed assembly. Preferably, it is positioned in a peripheral zone of the glass sheet or of the glazed assembly. "Peripheral zone of the glass sheet" or "peripheral zone of the glazed assembly" are understood to mean a part of the glass sheet, or of the glazed assembly, respectively, adjacent to the edges of the glass sheet or of the glazed assembly, respectively (i.e., to the edges delimiting the glass sheet or the glazed assembly). In certain embodiments, the peripheral zone of the glass sheet or of the glazed assembly is the zone of the glass sheet or of the glazed assembly adjacent to the edges of the glass sheet or of the glazed assembly and with a width (i.e., in a direction orthogonal to the edge of the glass sheet or, of the glazed assembly, in the plane of the glass sheet or of the glazed assembly) of less than or equal to 30 cm, or of less than or equal to 25 cm, or of less than or equal to 20 cm, or of less than or equal to 15 cm.

When the glazing is intended to be oriented vertically or substantially vertically in the vehicle (in particular when it is intended to be a windscreen, side glazing or a rear window), the exciter is advantageously located in a peripheral zone of the glass sheet, or of the glazed assembly adjacent to the lower edge of the glass sheet or of the glazed assembly (i.e., the edge intended for being on the side of the bottom of the vehicle).

When the glazing is a windscreen, the exciter may, additionally or alternatively, be located on a peripheral zone of the glass sheet or of the glazed assembly adjacent to the upper edge of the glass sheet or of the glazed assembly (i.e., the edge intended for being on the side of the top of the vehicle), preferably in a central zone of this upper peripheral zone (e.g., in a zone of the upper peripheral zone extending over a length of 30 cm, preferably 20 cm, in a direction parallel to the upper edge of the windscreen, on either side of the center of the upper edge). More preferably, when the windscreen comprises or is intended to comprise an interior rear-view mirror, the audio exciter is placed near the interior rear-view mirror fasteners of the windscreen (e.g., in a circular zone of the windscreen with a radius of less than or equal to 15 cm of which the center consists of the fasteners of the interior rear-view mirror or the location intended for receiving the fasteners of the rear-view mirror).

The glass sheet or glazed assembly may comprise one or more holes for the passage of the power supply of the audio exciter.

The audio exciter is assembled on the glass sheet or on the glazed assembly via a fixing system. The fixing system comprises a base mounted on the glass sheet or glazed assembly and an attachment part to which the exciter is attached. Preferably, the exciter is fixed to the attachment part of the fixing system in a removable manner. This has the advantage that the exciter may be easily removed and changed, e.g., in the event of a malfunction.

The audio exciter may be fixed to the attachment part of the fixing system by screwing. In particular, the attachment part may comprise or consist of one or more threaded parts projecting from the base of the fixing system. In these embodiments, the audio exciter comprises one or more tapped holes capable of being screwed onto the one or more threaded parts of the fixing system. Examples of a fixing system comprising a base consisting of a soleplate 1 and a mounting 2, and a threaded attachment part 3 are depicted in FIGS. 1, 2 and 3.

Referring to FIG. 1, the fixing system may comprise, as an attachment part 3, a threaded rod (or screw) positioned at the center of the mounting 2, and entirely located in the central zone of the base (e.g., in a zone centered on the center of the mounting and whose distance from its edge to its center is half, preferably 25%, of the distance from the center of the mounting to its edges). In these embodiments, the threaded rod is intended to be screwed into a tapped hole located in the audio exciter, preferably at the center thereof.

Referring to FIG. 2, the fixing system may comprise, as an attachment part 3, at least two threaded rods located in a peripheral zone of the mounting (e.g., in a zone adjacent to the edge(s) of the mounting 2 with a width (in a direction orthogonal to the edge) equal to half the distance from the edge of the mounting to the center of the mounting, preferably equal to 25% of the distance from the edge to the center of the mounting). The rods are preferably aligned in pairs with the center of the mounting 2 and are more preferably symmetrical in pairs with respect to the center of the mounting 2. In these embodiments, the threaded rods are intended to be screwed into tapped holes, preferably located in a peripheral zone of the audio exciter.

Referring to FIG. 3, the fixing system may comprise, as an attachment part 3, a solid or hollow threaded rod, centered on the center of the mounting 2 and whose thread is located in the peripheral zone of the mounting 2. In these embodiments, the threaded rod is intended to be screwed into a tapped hole located in the audio exciter, the tapping of which being preferably located in a peripheral zone of the audio exciter.

Alternatively, or additionally, the attachment part may comprise or consist of one or more tapped holes present in the base or in a part projecting from the base of the fixing system. In these embodiments, the audio exciter comprises one or more threaded parts capable of being screwed into the one or more tapped holes of the fixing system. Examples of a fixing system comprising a base consisting of a soleplate 1 and a mounting 2, and a tapped attachment part 3 are depicted in FIGS. 4 and 5.

Referring to FIG. 4, the fixing system may comprise, as an attachment part 3, at least two tapped holes in the mounting 2 located in a peripheral zone thereof. The holes are preferably aligned in pairs with the center of the mounting 2, and more preferably they are symmetrical in pairs with respect to the center of the mounting 2. In these embodiments, the tapped holes are intended to receive the threaded rods of the audio exciter, preferably located in a peripheral zone of the audio exciter.

Referring to FIG. 5, the fixing system may comprise, as an attachment part 3, a tapped hole in the mounting 2 centered on the center thereof. The tapping may be located in a central zone of the mounting, or in a peripheral zone of the mounting. In these embodiments, the tapped hole is intended to receive a threaded solid or hollow rod of the audio exciter, preferably located at the center of the audio exciter.

Alternatively, or additionally, to a mode for fixing by screwing, the audio exciter may be fixed to the attachment part of the fixing system by interlocking. In these embodiments, the attachment part of the fixing system and the audio exciter each comprise one or more indentations configured to interlock with each other. Examples of a fixing system comprising a base consisting of a soleplate 1 and a mounting 2, and a threaded attachment part 3 with indentations are depicted in FIGS. 6, 7 and 8.

Referring to FIG. 6, the fixing system may comprise, as an attachment part 3, a projecting part comprising at least one notch, preferably at least two notches, on its or their side face(s). The notch or notches may have any suitable shape, such as a rectangular shape Referring to FIG. 7, the fixing system may comprise, as an attachment part 3, a projecting part comprising at least one clip, preferably at least two clips, on its or their side face(s).

Referring to FIG. 8, the fixing system may comprise, as an attachment part 3, a projecting part comprising at least one notch on its upper face. The notch may have any suitable shape.

The base of the fixing system may comprise a mounting 2 positioned on the upper face of a soleplate 1. The term "soleplate" is understood to mean a part in the form of a plate projecting with respect to the mounting (in a direction orthogonal to the main plane of the glass sheet or of the glazed assembly). In other words, the soleplate 1 projects from the mounting 2 (in a plane parallel to the main plane of the glass sheet or of the glazed assembly), preferably over the entire perimeter of the mounting 2. Preferably, the soleplate 1 is fixed to the glass sheet or to the glazed assembly. In other embodiments, the base of the fixing system consists of a mounting 2.

Preferably, the attachment part 3 of the fixing system is present on or in the mounting 2, more particularly on the face of the mounting 2 opposite the face of the mounting facing the soleplate 1 or the glass sheet or the glazed assembly.

The mounting 2 may have any possible shape. Advantageously, the mounting 2 is a prism or a cylinder, the cross-section of which may have any shape, such as a circular or rectangular shape. In certain embodiments, the upper face (or the cross section) of the mounting 2 has a similar shape and dimensions identical or substantially identical to those of the bottom face of the audio exciter. The mounting 2 may have a diameter of 10 to 150 mm, e.g., 30 to 100 mm. In other embodiments, the mounting 2 may have a length of 30 to 200 mm, e.g., 50 to 150 mm, and/or a width of 10 to 100 mm, e.g., 20 to 60 mm. The mounting 2 advantageously has a depth of 1 to 20 mm, e.g., 3 to 8 mm.

The soleplate 1 may have any shape and preferably has a circular or rectangular shape. The soleplate 1 may have a diameter of 15 to 200 mm, e.g., 35 to 120 mm. In other embodiments, the soleplate may have a length of 35 to 250 mm, e.g., of 60 to 170 mm, and/or a width of 15 to 150 mm, e.g., of 25 to 70 mm. The soleplate 1 may have a depth of 1 to 10 mm, e.g., of 2 to 6 mm.

Preferably, the mounting 2 is centered on the upper face of the soleplate 1.

Advantageously, the fixing system comprises or is made of a metallic material, a thermoplastic material or a combination thereof. Examples of metallic materials suitable for the fixing system are aluminum and/or stainless steel. Examples of thermoplastic materials include the polyphthalamides, such as those sold under the trademark Grivory®, polyvinyl chloride (PVC) and/or polyethylene terephthalate (PET). Preferably, the fixing system does not comprise any magnetic material, in particular if the audio exciter is an electrodynamic exciter, so as not to interfere with the magnetic circuit of the exciter.

In particular, the attachment part 3 and the base, and more particularly the attachment part 3, the mounting 2 and the optional soleplate 1, may independently comprise or be made of the materials mentioned herein before.

The base of the fixing system, in particular the soleplate 1 and/or the mounting 2, and/or the attachment part 3 may form a single piece or the fixing system may comprise different parts (e.g., a part for the soleplate 1, a part for the mounting 2 and possibly a part for the attachment part 3) assembled together, by any suitable means.

The fixing system is mounted on the glass sheet or on the glazed assembly. The glazing may comprise one or more fixing systems, e.g., at least 2, or at least 3, or at least 4, or at least 5, or at least 10, or at least 15 fixing systems mounted on the glass sheet or on the glazed assembly. In a particularly advantageous manner, the glazing comprises an identical number of audio exciters and of fixing systems, each fixing system having an audio exciter fixed to its attachment part 3. The fixing systems may be identical or different. Particularly, each fixing system may independently be as described herein before.

Preferably, the base of the fixing system is fixed to the glass sheet or to the glazed assembly. More preferably, the base is fixed to the glass sheet or to the glazed assembly by means of glue, an adhesive tape, in particular a double-sided adhesive tape, or a combination thereof. When the base of the fixing system comprises a soleplate 1, in a particularly preferred manner, the soleplate 1 is fixed to the glass sheet or to the glazed assembly, preferably by glue and/or an adhesive tape, preferably a double-sided adhesive tape.

The attachment of the fixing system to the glass sheet or to the glazed assembly shall be such as to allow the transfer of vibrations from the audio exciter to the glass sheet or to the glazed assembly. In other words, it should provide at least one point of contact (direct or indirect) between the fixing system on which the audio exciter is fixed and the glass sheet or the glazed assembly.

The base of the fixing system is bonded to a part made of plastic material partly covering the glass sheet or the glazed assembly. In the present application, the term "bonded" is understood to mean that the base of the fixing system is fixedly mounted to the part made of plastic material. Thus, the transmission of vibrations from the audio exciter to the glass sheet is improved with respect to other fixing modes, which makes it possible to obtain optimum sound performance of the glazing.

Overmolding of the Fixing System

According to a first variant, the part made of plastic material 5 is overmolded onto at least a part of the base of the fixing system. In this variant, the part made of plastic material 5 is also referred to as "overmolding". Preferably, the base is overmolded by the plastic material over its entire periphery.

In this first variant, the base of the fixing system comprises, in a particularly advantageous manner, a mounting 2 and a soleplate 1, as disclosed herein before. The soleplate and the mounting are then overmolded, at least in part, by the plastic material. Advantageously, the soleplate 1 is entirely overmolded, i.e., entirely coated by the overmolding. Preferably, the mounting 2 is entirely overmolded, with the exception of its upper face, i.e., the mounting is in contact with the overmolding through its or their side face(s). In a particularly preferred way, the attachment part 3 is not overmolded.

Advantageously, the plastic material of the overmolding comprises or is made of polyurethane, polypropylene, or a combination thereof.

In the embodiments wherein the glazing is an encapsulated glazing, the overmolding may be continuous with the encapsulating seal. Referring to FIG. 9, a fixing system, comprising a soleplate 1 surmounted by a mounting 2, itself surmounted by an attachment part 3 intended for fixing an audio exciter, is fixed onto a glass sheet 4. Alternatively, the glass sheet 4 may be replaced by a glazed assembly, such as a laminated glazing. The mounting 2 and the soleplate 1 are overmolded by an overmolding 5 over their entire periphery. The attachment part 3 is not coated by the overmolding 5. In this embodiment, the overmolding 5 forms part of the encapsulating seal 6 which covers the edge of the glass sheet 4. In a particularly advantageous way, the encapsulating seal has a recess 9 between the overmolding 5 surrounding the fixing system and the part of the encapsulating seal 6 surrounding the edge of the glass sheet 4. This recess 9 is intended to receive a glue seal 7 for fixing the vehicle body 8 to the glazing. The presence of this recess 9 enables the glazing to be glued uniformly to the automobile body 8.

Alternatively, the overmolding may be discontinuous with the encapsulating seal. Referring to FIG. 10, a fixing system, comprising a soleplate 1 surmounted by a mounting 2, itself surmounted by an attachment part 3 intended for fixing an audio exciter, is fixed onto a glass sheet 4. Alternatively, the glass sheet 4 may be replaced by a glazed assembly, such as a laminated glazing. The mounting 2 and the soleplate 1 are overmolded by an overmolding 5 over their entire periphery. The attachment part 3 is not coated by the overmolding 5. In this embodiment, the overmolding 5 is discrete of the encapsulating seal 6 which covers the edge of the glass sheet 4. Therefore, a zone 10 devoid of plastic material is present between the overmolding 5 surrounding the fixing system and the encapsulating seal 6 surrounding the edge of the glass sheet 4. This zone 10 of discontinuation of the encapsulating seal is intended to receive a glue seal 7 for fixing the body 8 to the glazing. The presence of this zone 10 of discontinuation of the encapsulating seal enables the glazing to be glued uniformly to the automobile body 8.

In advantageous embodiments, the fixing system and the overmolding are concealed on the side of the glass sheet, or of the glazed assembly, opposite the side where the fixing system is present (this side corresponding to the outside of the vehicle when the glazing is assembled in a vehicle). For example, the glass sheet, or the glazed assembly, may have been enameled on the surface opposite that carrying the fixing system, on an area comprising the area covered by the fixing system and the overmolding. Alternatively, in the case of encapsulated glazing, the encapsulating seal covering the edge of the glass sheet or of the glazed assembly may be extended over the surface opposite that carrying the fixing system over a zone comprising the zone covered by the fixing system and the overmolding. An example of such an embodiment is shown in FIG. 11. The encapsulating seal 6 encompassing the glass sheet 4 (which may alternatively be a glazed assembly such as a laminated glazing) comprises a part 11 extending over the outer surface 12 of the glass sheet 4 (i.e., the surface opposite the surface supporting the fixing system), over a portion sufficient to conceal the fixing system and its overmolding 5. In the example shown in FIG. 11, the encapsulating seal 6 and the overmolding 5 are discontinuous. The encapsulating seal and the overmolding may alternatively be continuous, the encapsulating seal preferably including a recess intended to receive the glue in order to fix the glazing to the body.

The overmolded fixing system may be located in the windscreen plate. In these embodiments, the plate preferably comprises an opening in which the fixing system is placed, overmolded by the part made of plastic material. This plate is advantageously thermoformed, preferably it is made of polyethylene. The plate may also comprise a rearview mirror, a rain sensor, and/or a camera.

The glazings according to the first variant may be manufactured by an injection molding method.

Thus, another object of the invention is a method for manufacturing a glazing as described herein before, comprising:
- placing the glass sheet, or the glazed assembly in a mold;
- positioning the fixing system comprising a base and an attachment part in the mold on the glass sheet or on the glazed assembly;
- closing the mold so as to create a mold cavity around the base of the fixing system, the attachment part of the fixing system being outside the mold cavity;
- injecting plastic material into the molding cavity so as to form an overmolding;
- opening the mold and demolding the overmolded glass sheet or glazed assembly;
- fixing at least one audio exciter to the attachment part of the fixing system.

The mold comprises at least one movable part and at least another part, which may be fixed or movable.

Preferably, during positioning of the fixing system in the mold, the attachment part of the fixing system is arranged in a housing formed in a part of the mold, preferably in a movable part of the mold. Preferably, the fixing system is positioned in the mold so that the upper face of the base (i.e., opposite the face facing the glass sheet or the glazed assembly), more preferably the upper face of the mounting, is at least partly supported by the inner surface of the part of the mold comprising the housing for the attachment part. Optionally, a tightness seal, preferably an O-ring, may be placed on the fixing system, preferably on the upper face of the base, more preferably on the upper face of the mounting, around the attachment part, more preferably along the edge of the upper face of the mounting.

Preferably, the base of the fixing system is fixed to the glass sheet, or to the glazed assembly, by means of glue, an adhesive tape, in particular a double-sided adhesive tape, or a combination thereof. Thus, it is possible to deposit adhesive on the lower face of the base (i.e., the face intended to face the glass sheet or the glazed assembly) and/or it is possible to remove the protective film from the double-sided adhesive tape previously bonded to the lower face of the base of the fixing system.

The mold is then closed by moving the movable part of the mold. A mold cavity is then formed around the base of the fixing system. Preferably, the soleplate of the fixing system is entirely contained in the molding cavity. Advantageously, the part of the mold comprising the housing for the attachment part abuts onto an upper face (i.e., opposite the face facing the glass sheet or the glazed assembly) of the base, preferably of the mounting. The tightness seal is advantageously placed between the upper face of the base, preferably of the mounting, and the part of the mold comprising the housing for the attachment part. This makes it possible to ensure the tightness of the housing receiving the attachment part, so that the plastic material does not reach the attachment part during injection. The tightness can also be achieved by direct contact between the upper face of the base and the inner surface of the part of the mold comprising the housing.

The plastic material injected into the mold cavity is preferably polyurethane, polypropylene, or a combination thereof. The plastic material is injected in the molten state. The soleplate of the fixing system may comprise one or more openings on the upper face (i.e., opposite the face facing the glass sheet or the glazed assembly), these preferably being through openings. This allows better anchoring of the fixing system in the plastic material forming the overmolding. Preferably, the molding cavity is completely filled with the plastic material.

The plastic material in the mold cavity solidifies to form an overmold of plastic material on at least a part of the base of the fixing system. Then the mold is opened, preferably by moving the movable part, e.g., by means of a press. The glass sheet, or the glazed assembly, comprising the fixing system and the overmolding (also referred to as "overmolded glass sheet" or "overmolded glazed assembly" respectively) can be removed from the mold.

An example of use of a mold for manufacturing an example of glazing according to the invention is illustrated in FIG. 12. In this example, the mold used comprises a movable part 13 comprising a housing 15 and a second part 14 which may be fixed or movable. The mold contains a glass sheet 4 (or alternatively may contain a glazed assembly, such as a laminated glazing) on which a fixing system is fixed comprising a soleplate 1 in the form of a plate surmounted by a cylindrical mounting 2, itself being surmounted by an attachment part 3 consisting of a threaded rod. The soleplate 1 is bonded to the glass sheet 4 by an adhesive 16 located between the lower face of the soleplate 1 and the glass sheet 4. The mold is thus closed forming a molding cavity 18 around the soleplate 1 of the fixing system and a part of the mounting 2. The fixing system has been positioned so that the attachment part 3 is placed in the housing 15 of the mold and so that a part of the upper face of the mounting 2 is in contact with the mold, and more particularly with the inner face of the part 13 of the mold comprising the housing 15. The inside of the housing 15 is thus isolated from the molding cavity 18 because of the presence of the mounting 2. An O-ring 17 may be inserted between the perimeter of the upper face of the mounting 2 and the part of the mold 13. The molding cavity 18 has been completely filled with plastic material which, upon hardening, will form the overmolding.

The molding cavity may have any suitable shape. In other embodiments, the mold cavity may contain the edge of the glass sheet, or of the glazed assembly, such that the injection of plastic also forms an encapsulating seal surrounding said edge of the glass sheet or of the glazed assembly. Preferably, the molding cavity comprises a relief towards the inside of the cavity making it possible to create a recessed zone or a discontinuation zone (in this case, the relief extends until it comes into contact with a portion of the glass sheet or of the glazed assembly, separating the cavity in two) between the overmolding surrounding the fixing system and the part of the encapsulating seal surrounding the edge of the glass sheet or of the glazed assembly. The cavity may also be such that a portion of the outer face of the glass sheet or of the glazed assembly (i.e., the face opposite the face carrying the fixing system) is included inside the cavity, in contact with the injected plastic material, preferably such that the formed encapsulating seal projects over the outer face of the glass sheet or of the glazed assembly over a zone extending at least as far as the end of the overmolding surrounding the fixing system.

Thermoforming of the Fixing System

According to a second variant, the base of the fixing system is thermoformed in (or with) the part made of plastic material. In this second variant, the part made of plastic material and the base of the fixing system form a single piece.

Advantageously, the assembly of the fixing system is thermoformed in (or with) the part made of plastic material.

The part made of plastic material is preferably a plate. The plate may also comprise a rearview mirror, a rain sensor, and/or a camera. More preferably, the glazing is a windscreen. More preferably, the plate is located in a central zone of the upper peripheral zone of the windscreen, as defined herein before.

The part made of plastic material can have any shape. Preferably, it has a thickness of 1 to 4 mm, e.g., of 1.5 to 2.5 mm.

In this second variant, the base of the fixing system may comprise a mounting and a soleplate or a single mounting.

In a particularly advantageous manner, the assembly of the part made of plastic material and the base of the fixing system are fixed to the glass sheet, or to the glazed assembly, by bonding. In certain embodiments, the bonding is spot bonding. In a particularly preferred way, the base of the fixing system is fixed to the glass sheet or to the glazed assembly through at least one glue spot such as to ensure the transfer of vibrations from the audio exciter to the glass sheet or to the glazed assembly. However, any other fixing means making it possible to guarantee this vibratory transfer may be used.

Preferably, the part made of plastic material and the base of the fixing system, preferably the fixing system assembly, are made of polyethylene, thermoplastic elastomer (TPE), acrylonitrile butadiene styrene (ABS), or a combination thereof.

The glazings according to the second variant can be manufactured by a thermoforming method. Such a manufacturing method may comprise:
  placing a block of plastic material in a mold;
  heating the block of plastic material;
  cooling the plastic material, so as to obtain a thermoformed part;
  demolding the thermoformed part;
  assembling the thermoformed part with the glass sheet or glazed assembly;
  fixing at least one audio exciter to the attachment part of the fixing system.

The mold is configured to form the plastic part and the base of the fixing system, and more preferably, to form the plastic part and the fixing system comprising a base and an attachment part as described herein before. After being placed in the mold, the block of plastic material is heated until it is softened. The plastic material then assumes the shape given by the mold and is then cooled so as to become rigid. A thermoformed part, comprising the part made of plastic material and the base of the fixing system, preferably the fixing system, is obtained.

The plastic block may be a block of polyethylene, TPE, ABS, or a combination thereof.

The thermoformed part is preferably assembled with the glass sheet, or with the glazed assembly, by gluing.

Vehicle

The invention is intended for equipping a vehicle, preferably a motor vehicle. The at least one audio exciter is thus intended to be located in the passenger compartment of the vehicle. In other words, it is intended for being placed on the inner surface of the glass sheet, or of the glazed assembly.

The audio exciter may be intended for being covered or surrounded by a vehicle interior trim, so as to be entirely or partially concealed from the passengers of the vehicle.

Preferably, a vehicle may comprise at least two audio exciters. For example, the vehicle may comprise a glazing unit according to the invention comprising at least two audio exciters, can comprise at least two glazing units according to the invention each comprising at least one audio exciter, or can comprise at least one glazing unit according to the invention comprising at least one audio exciter and at least one other audio exciter, located in a glazing unit of the vehicle or in any other location of the vehicle (such as in a pillar, in a door, in the dashboard, or in the roof).

The invention claimed is:

1. A vehicle glazing comprising:
   a glass sheet or a glazed assembly,
   a part made of plastic material partly covering the glass sheet or the glazed assembly,
   at least one fixing system for an audio exciter mounted on the glass sheet or on the glazed assembly, comprising a base and an attachment part, the base of the fixing system being connected to the part made of plastic material, and
   at least one audio exciter fixed to the attachment part of the fixing system,
   wherein the part made of plastic material is overmolded onto at least a part of the base of the fixing system or the base of the fixing system is thermoformed in the part made of plastic material, and
   wherein the vehicle glazing is a windscreen, a rear window, a side glazing and/or a roof glazing of a vehicle.

2. The glazing according to claim 1, wherein the base is fixed to the glass sheet or glazed assembly using a double-sided adhesive tape or a glue.

3. The glazing according to claim 1, wherein the audio exciter is fixed to the attachment part by screwing and/or interlocking.

4. The glazing according to claim 1, wherein the glass sheet is made of mineral glass, or the glazed assembly comprises at least one glass sheet that is made of mineral glass.

5. The glazing according to claim 1, comprising a glazed assembly and wherein the glazed assembly is a laminated glazing comprising at least two glass sheets between which at least one interlayer film made of viscoelastic plastic is inserted.

6. The glazing according to claim 1, wherein the base of the fixing system comprises a soleplate mounted on the glass sheet or on the glazed assembly and surmounted by a mounting, the soleplate projecting with respect to the mounting.

7. The glazing according to claim 1, wherein the fixing system is made of a metallic material, a thermoplastic material, or a combination thereof.

8. The glazing according to claim 1, wherein the part made of plastic material is made of polyurethane, polypropylene, or a combination thereof.

9. The glazing according to claim 1, wherein the part made of plastic material and the base of the fixing system are made of polyethylene, thermoplastic elastomer, acrylonitrile butadiene styrene, or a combination thereof.

10. A method for manufacturing glazing according to claim 1, comprising:
   placing the glass sheet or the glazed assembly in a mold;
   positioning the fixing system comprising a base and an attachment part in the mold on the glass sheet or on the glazed assembly;
   closing the mold so as to create a mold cavity around the base of the fixing system, the attachment part of the fixing system being outside the mold cavity;
   injecting plastic material into the molding cavity so as to form an overmolding constituting the part made of plastic material;

opening the mold and demolding the overmolded glass sheet or the overmolded glazed assembly, and fixing the audio exciter to the attachment part of the fixing system.

11. A method for manufacturing glazing according to claim 1, comprising:

placing a block of plastic material in a mold configured to form the fixing system comprising a base and an attachment part;

heating the block made of plastic material so as to soften it;

cooling the plastic material so as to obtain a thermoformed part comprising the part made of plastic material and the fixing system;

demolding the thermoformed part;

assembling the thermoformed part with the glass sheet or glazed assembly, and fixing the audio exciter to the attachment part of the fixing system.

12. The glazing according to claim 5, wherein the viscoelastic plastic is PVB (polyvinyl butyral), ethylene-vinyl acetate copolyme or acoustic PVB.

13. The glazing according to claim 7, wherein the metallic material is aluminum and/or stainless steel and the thermoplastic material is polyphthalamides, polyvinyl chloride, and/or polyethylene terephthalate.

14. The glazing according to claim 1, wherein the fixing system is thermoformed in the part made of plastic material.

15. The glazing according to claim 1, wherein the vehicle is an automobile.

* * * * *